US007401841B2

(12) United States Patent
Asendorf

(10) Patent No.: US 7,401,841 B2
(45) Date of Patent: Jul. 22, 2008

(54) DEVICE FOR DISPLACING A REAR HATCH OF A MOTOR VEHICLE REAR OF A MOTOR VEHICLE AND METHOD FOR CLOSING A REAR HATCH OF A MOTOR VEHICLE

(75) Inventor: Sven Asendorf, Herrsching (DE)

(73) Assignee: HS Genion GmbH, Krailling (DE)

( * ) Notice: Subject to any disclaimer, the term of this patent is extended or adjusted under 35 U.S.C. 154(b) by 0 days.

(21) Appl. No.: 11/572,455

(22) PCT Filed: Jul. 22, 2005

(86) PCT No.: PCT/DE2005/001317

§ 371 (c)(1),
(2), (4) Date: Jan. 22, 2007

(87) PCT Pub. No.: WO2006/010365

PCT Pub. Date: Feb. 2, 2006

(65) Prior Publication Data

US 2007/0246964 A1 Oct. 25, 2007

(30) Foreign Application Priority Data

Jul. 22, 2004 (DE) ...................... 10 2004 035 638

(51) Int. Cl.
*B60J 5/00* (2006.01)

(52) U.S. Cl. ................ 296/146.11; 296/56; 296/146.8; 296/146.12

(58) Field of Classification Search .................. 296/51, 296/50, 56, 146.4, 146.8, 146.11, 146.12; 49/259, 258, 502

See application file for complete search history.

(56) References Cited

U.S. PATENT DOCUMENTS

| | | | | |
|---|---|---|---|---|
| 3,628,216 | A | 12/1971 | Savell | |
| 5,244,247 | A | 9/1993 | Kuwabara | |
| 2005/0116497 | A1 * | 6/2005 | DeBono | 296/146.11 |
| 2006/0125283 | A1 * | 6/2006 | Guler | 296/146.4 |

FOREIGN PATENT DOCUMENTS

| | | | |
|---|---|---|---|
| DE | 91 01 754.8 | U1 | 6/1991 |

OTHER PUBLICATIONS

International Search Report for International Application No. PCT/DE2005/001317, English.

* cited by examiner

*Primary Examiner*—Jason S Morrow
(74) *Attorney, Agent, or Firm*—David S. Safran

(57) ABSTRACT

Back of a motor vehicle with a rear hatch, a rear hatch opening and a device for moving the rear hatch of a motor vehicle between a closed position and an intermediate position. The device has positioning means by which the rear hatch can be moved solely by linear translation between the intermediate position and the closed position. In the intermediate position, the opening edge and the rear hatch edge as a whole have an essentially constant distance from one another. For closing the rear hatch from the open position, the rear hatch is pivoted out of the open position into the intermediate position, and afterwards, linear displacement of the rear hatch out of the intermediate position into the closed position is performed, the linear displacement taking place over a path from 1 cm to 5 cm.

7 Claims, 2 Drawing Sheets

DEVICE FOR DISPLACING A REAR HATCH OF A MOTOR VEHICLE REAR OF A MOTOR VEHICLE AND METHOD FOR CLOSING A REAR HATCH OF A MOTOR VEHICLE

BACKGROUND OF THE INVENTION

1. Field of the Invention

The invention relates to a device for moving the rear hatch of a motor vehicle, the rear hatch being able to assume a closed position and an intermediate position which differs from the closed position. The invention furthermore relates to the back of a motor vehicle with a rear hatch and a rear hatch opening, the rear hatch opening having an opening edge and the rear hatch having a rear hatch edge, the rear hatch being able to assume a closed position and an intermediate position between the closed and open positions. Moreover, the invention relates to a process for closing the rear hatch of a motor vehicle, the rear hatch having an open position, a closed position and an intermediate position between the closed and open positions.

2. Description of Related Art

In devices for moving the rear hatch of a motor vehicle, according to the prior art human body parts, especially fingers and hands, can easily be pinched or squeezed between the rear hatch opening and the rear hatch. To prevent this, various anti-pinching systems have been developed. They work either with sensors, such as, for example, with infrared or ultrasonic sensors or mechanical contacts, or in the case of motor-controlled devices for moving the rear hatch, with time-dependent or event-dependent control of the motor current.

SUMMARY OF THE INVENTION

The object of the invention is to improve the motion of the rear hatch and to improve the configuration of the rear of a motor vehicle in order to thus protect human body parts, especially fingers and hands, even more reliably against pinching.

This object is achieved in accordance with the invention by providing a positioning means for moving the rear hatch between a closed position and an intermediate position solely by a linear translational movement.

The basic idea of the invention is to ensure that an essentially constant peripheral distance exists in the intermediate position between the rear hatch and rear hatch opening as a whole. In all positions of the rear hatch, between the open position and the closed position, his prevents such a great distance from existing between the rear hatch and the rear hatch opening that, even in the area of the hinge with which the rear hatch is conventionally connected to the remainder of the vehicle, there is no danger of pinching for fingers and hands. This is a clear improvement over the prior art, where the distance between the rear hatch and rear hatch opening in the region of the hinge is always clearly less than in the region of the rear hatch facing away from the hinge, for example near the rear hatch lock which lies in the lower region of the rear hatch opening.

Between the open position and the intermediate position of the rear hatch, the rear hatch can be further pivoted in the manner known from the prior art; this allows further use of existing positioning means for this positioning area.

It is preferred for the rear hatch to have a lift difference between the intermediate position and the closed position which is between 1 cm and 5 cm, or when in the intermediate position the distance between the rear hatch edge and opening edge is between 1 cm and 5 cm essentially overall. This lift difference or distance, on the one hand prevents, fingers or hands from being pinched in the intermediate position, and on the other hand, the rear hatch region is then no longer exposed to weathering influences completely without protection. It is especially preferred if the rear hatch has a lift difference between the intermediate position and the closed position which is roughly 2 cm, or when in the intermediate position, the distance between the rear hatch edge and opening edge is roughly 2 cm essentially overall. This is the distance which is generally appropriate for protection of fingers and hands against pinching.

A preferred embodiment of the invention is described below in conjunction with the accompanying drawings.

DETAILED DESCRIPTION OF THE INVENTION

Figure 1:
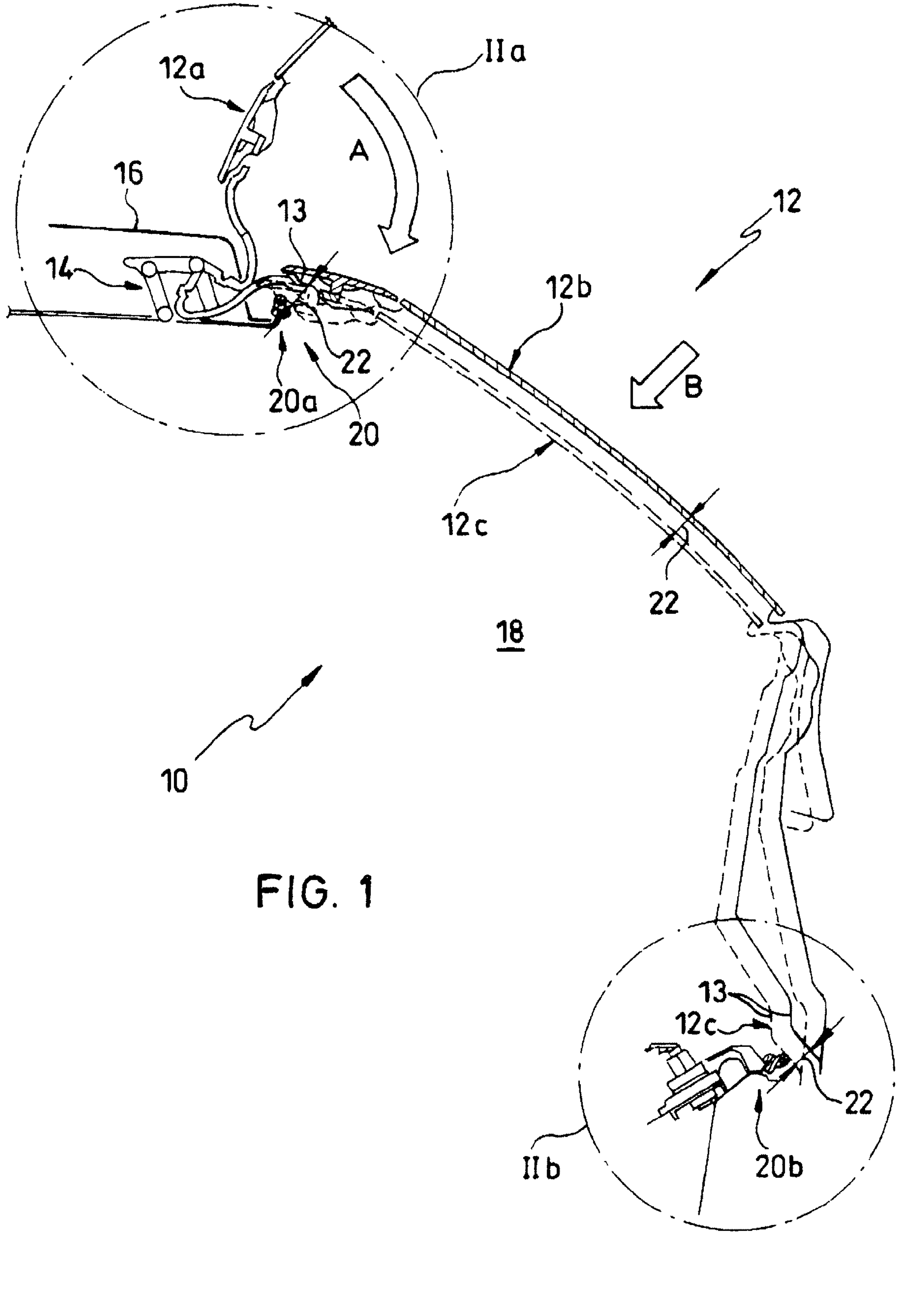
FIG. 1 is a sectional view of the back of a motor vehicle in accordance with the invention.
Figure 2A:
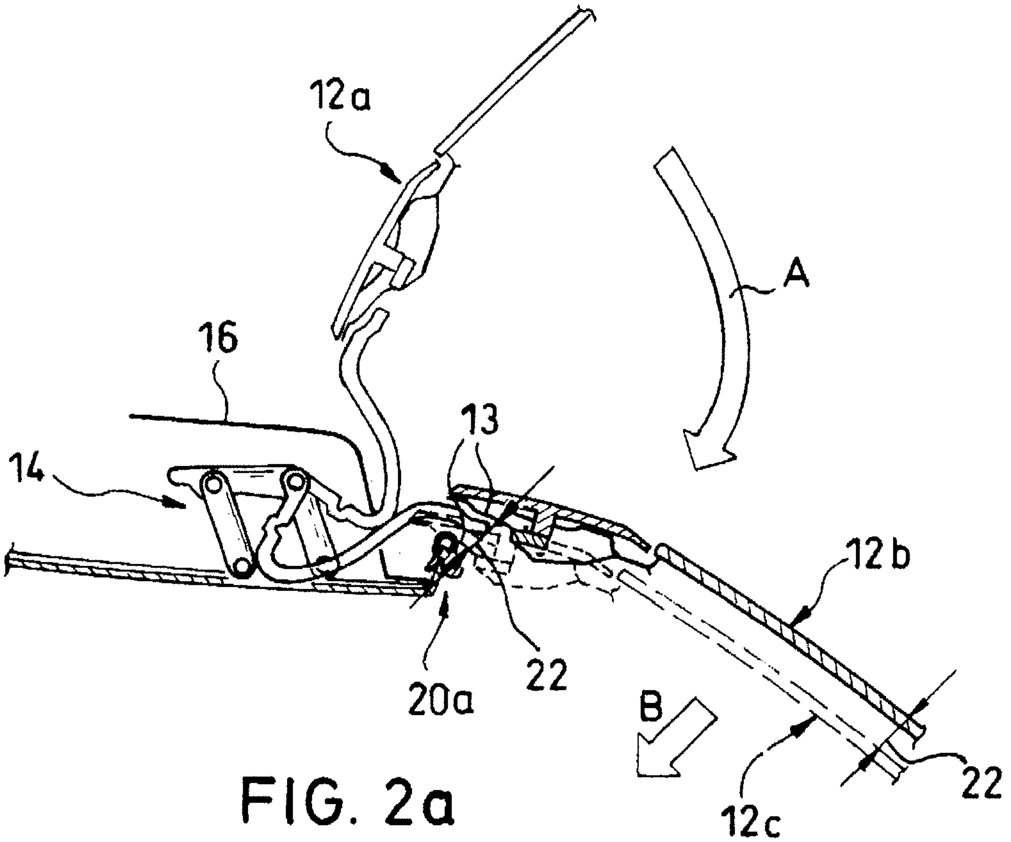
FIGS. 2*a* and 2*b* are enlarged views of the encircled details IIa and IIb, respectively, shown in FIG. 1.
Figure 2B:
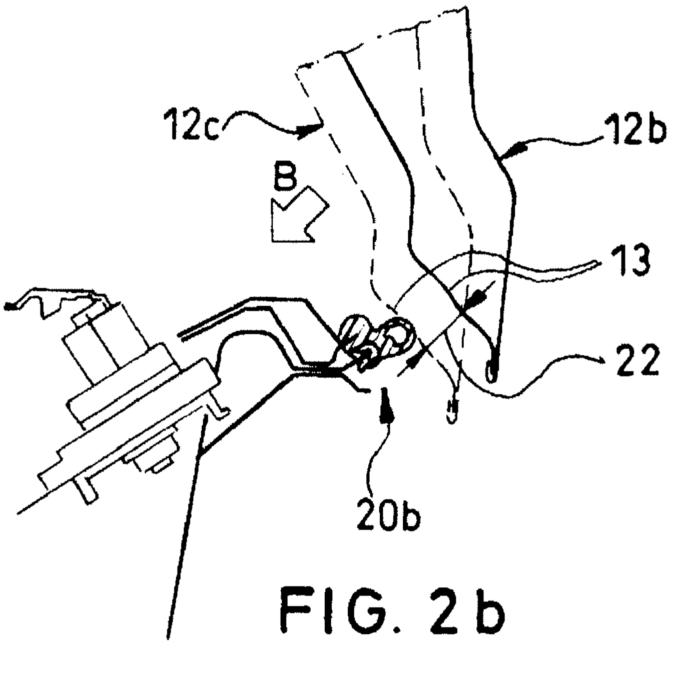

FIGS. 1, 2*a*, & 2*b* show the back 10 of a motor vehicle with a rear hatch 12 and a rear hatch opening 18. The rear hatch 12 can be moved relative to the rear hatch opening by means of a device for moving the rear hatch 12. The device for moving the rear hatch 12 has a positioning means 14 by which the rear hatch 12 is connected in the manner of a hinge to the roof 16 of the motor vehicle. The rear hatch 12 has a rear hatch edge 13, and the rear hatch opening 18 has an opening edge 20 with opening edge sections 20*a*, 20*b*.

The rear hatch 12, depending on the operating state, is in the open position 12*a*, in the intermediate position 12*b* or in the closed position 12*c* (broken line). In the open position 12*a*, the rear hatch 12 is raised in the conventional manner. In the intermediate position 12*b*, the rear hatch edge 13 of the rear hatch 12 has a distance both relative to the opening edge section 20*a* and also relative to the opening edge section 20*b*, i.e., the distance between the rear hatch edge 13 and the opening edge 20, that is so great that fingers or hands cannot be pinched. In the closed position 12*c*, the rear hatch edge 13 of the rear hatch 12 adjoins the opening edge sections 20*a*, 20*b*. Between the intermediate position 12*b* and the closed position 12*c* the rear hatch 12 has a lift difference 22.

The process for closing the rear hatch will be explained below.

In the open position 12*a*, the rear hatch 12 is raised. In the first stage of the closing process, the rear hatch 12 is pivoted into the intermediate position 12*b* in the direction of the arrow A in FIGS. 1 & 2*a* by the positioning means 14 by a pivoting motion. In the intermediate position 12*b*, the rear hatch edge 13 now has a distance from the opening edge 22 corresponding to the lift difference 22 on all sides (see especially the figures in the region of the opening edge sections 20*a*, 20*b*), the lift difference preferably being between 1 cm and 5 cm. Therefore, in this phase of the closing process, there is no risk of pinching of the fingers or hands since the distance between the rear hatch edge 13 and opening edge 22 at any instant corresponds at least to the lift difference 22. Locking of the lock of the rear hatch 12 can preferably also be linked to reaching the intermediate position 12*b*. Thus both the effect of weathering on the vehicle interior can be minimized and also adequate protection against theft can be achieved at this time.

In another step, linear displacement of the rear hatch 12 directly or indirectly by the positioning means 14 takes place by the lift difference 22 in the direction of the arrow B from the intermediate position 12*b* into the closed position 12*c*. Displacement of the rear hatch 12 can take place via one or more motorized drives (not shown). The outputs of the drives can preferably be controlled such that, while overcoming the lift difference 22, especially low power closing of the rear hatch 12 is achieved; this also reduces the risk of pinching again in this process step. When the closed position 12*c* is reached, the rear hatch edge 13 tightly adjoins the opening edge sections 20*a* and 20*b*. The step of linear displacement of the rear hatch 12 can also be executed, for example, only when the vehicle has been started and it is ensured that all vehicle passengers are in the vehicle and can no longer reach into the gap between the rear hatch edge 13 and the opening edge 22.

The invention claimed is:

1. Rear hatch of a motor vehicle, comprising:

a rear hatch, and positioning means for moving the rear hatch between a closed position and an intermediate position solely by a linear translational movement;

wherein said rear hatch is pivotable about a pivot axis extending parallel to a top edge of the hatch from an open position into said intermediate position; and wherein said positioning means moves the rear hatch from said intermediate position into said closed position in a direction transverse to both a bottom edge area and a lengthwise direction of the hatch in said intermediate position so as to bring an inner side of said bottom edge area against a closure seal.

2. Rear hatch as claimed in claim 1, wherein the rear hatch has a lift difference between the intermediate position and the closed position which is between 1 cm and 5 cm.

3. Rear of a motor vehicle, comprising:

a vehicle body having a rear hatch opening with an opening edge, a rear hatch having a rear hatch edge, wherein the rear hatch has a closed position and an intermediate position between which it is movable, wherein the opening edge and the rear hatch edge overall have an essentially constant distance from one another in the intermediate position, wherein said rear hatch is pivotable about a pivot axis extending parallel to a top edge of the hatch from an open position into said intermediate position, and wherein a positioning means moves the rear hatch from said intermediate position into said closed position in a direction transverse to both a bottom edge area and a lengthwise direction of the hatch in said intermediate position so as to bring an inner side of said bottom edge area against a closure seal.

4. Rear of a motor vehicle as claimed in claim 3, wherein the distance between the rear hatch edge and opening edge in the intermediate position is between 1 cm and 5 cm.

5. Process for closing a rear hatch of a motor vehicle that is able to assume an open position, a closed position and an intermediate position, comprising the following steps:

pivoting of the rear hatch out of the open position into the intermediate position about a pivot axis extending parallel to a top edge of the hatch, producing a linear displacement of the rear hatch out of the intermediate position into the closed position in a direction transverse to both a bottom edge area and a lengthwise direction of the hatch in said intermediate position so as to bring an inner side of said bottom edge area against a closure seal, the linear displacement taking place over a path from 1 cm to 5 cm.

6. Rear hatch of a motor vehicle according to claim 1, wherein said positioning means comprises a four-bar linkage.

7. Rear of a motor vehicle according to claim 3, wherein said positioning means comprises a four-bar linkage.

* * * * *